United States Patent [19]

Takada

[11] Patent Number: 4,498,690
[45] Date of Patent: * Feb. 12, 1985

[54] DRIVE DEVICE FOR PASSIVE VEHICLE OCCUPANT RESTRAINT BELT SYSTEM

[76] Inventor: Juichiro Takada, 3-12-1, Shinmachi Setagayaku, Tokyo, Japan

[*] Notice: The portion of the term of this patent subsequent to Oct. 18, 2000 has been disclaimed.

[21] Appl. No.: 396,804

[22] Filed: Jul. 9, 1982

[30] Foreign Application Priority Data

Jul. 20, 1981 [JP] Japan .............. 56-106638[U]
Aug. 26, 1981 [JP] Japan .............. 56-125285[U]

[51] Int. Cl.³ ............................................. B60R 21/10
[52] U.S. Cl. .................................. 280/804; 242/75.45
[58] Field of Search ........... 280/804, 807, 801, 802; 242/71.2, 75.45, 107.3, 107.7, 156.1

[56] References Cited

U.S. PATENT DOCUMENTS

| | | | |
|---|---|---|---|
| 3,669,376 | 6/1972 | Lucas | 242/75.45 |
| 3,836,984 | 9/1974 | Hertel et al. | 242/71.2 |
| 3,930,523 | 1/1976 | Marlasca Garcia | 242/75.45 |
| 4,410,202 | 10/1983 | Takada | 280/804 |

Primary Examiner—Joseph F. Peters, Jr.
Assistant Examiner—Ross Weaver
Attorney, Agent, or Firm—Brumbaugh, Graves, Donohue & Raymond

[57] ABSTRACT

A drive device for a movable belt guide in a passive vehicle occupant restraint belt system comprises a rotatable sprocket wheel having a multiplicity of sprocket teeth that provide positive winding and unwinding of a flexible drive tape having holes that receive the sprocket teeth. A guide member that keeps the tape from loosening on the sprocket wheel is engaged by a guide control member that controls the guide member in relation to the number of turns of the belt on the sprocket wheel.

7 Claims, 14 Drawing Figures

DRIVE DEVICE FOR PASSIVE VEHICLE OCCUPANT RESTRAINT BELT SYSTEM

FIELD OF THE INVENTION

The present invention relates to vehicle occupant restraint belt systems of the so-called passive type, that is, the type of system in which the belt automatically transfers between a configuration in which the occupant is released and a configuration in which he or she is restrained in response to closing and opening of the vehicle door.

BACKGROUND OF THE INVENTION

There have been many proposals in recent years for passive type vehicle occupant restraint belt systems. Such proposals have been prompted by recognition that conventional systems in which the belt must be done up and undone by the occupant are often not used because the occupant finds it inconvenient to connect and disconnect the belt each time he or she enters or leaves the vehicle. The most common type of passive restraint belt system involves a movable belt transfer guide (either a guide ring or a movable anchor) located either inboard or outboard of the vehicle seat and movable back and forth in a manner to position the belt in a releasing or restraining configuration.

One problem with many passive belt systems is that the drive wire, such as a racked wire, for moving a belt guide or a movable belt anchor includes a portion of a length slightly greater than the distance along which the movable belt guide ring or movable anchor moves between the restraining and releasing positions that extends like a tail out from the opposite side of the motor or other drive device from that portion leading from the motor to the guide ring or movable anchor. That tail portion is usually guided within a sheath suitably installed within the side body panel adjacent the outboard side of the rear seat and causes difficulties in the design and installation of the system. For one thing, the drive motor often has to be located a considerable distance from the belt transfer guide in order that the tail portion of the wire can be located in a place in the vehicle body where there is room and where it does not interfere with other vehicle systems. This means that the length of drive wire is increased and the installation of the system becomes more complicated and costly. Moreover, the extra length of wire and sheathing increases costs, particularly with the use of relatively expensive racked wire material.

The present inventor has recently made an improvement in drive devices for passive belt systems that eliminates the tail portion altogether. The improvement is described and shown in U.S. patent application Ser. No. 313,369 filed Nov. 21, 1981, and entitled "Passive Vehicle Occupant Restraint Belt System." According to that invention the drive device for the belt transfer guide comprises a rotatable sprocket wheel driven by a reversible electric motor through a speed reducer gear transmission or by any other suitable drive device. One end of a flexible drive tape is fastened to the sprocket wheel, and the other end is fastened to the belt transfer guide. The tape has sprocket holes in at least the portion that is wound onto the sprocket wheel. The fact that the tape winds onto the sprocket wheel means that the troublesome tail of prior systems is eliminated.

It is desirable that whatever wraps of the drive tape that are on the sprocket wheel at any particular time be kept tight, especially when the drive device is operating in the unwinding direction. To that end, the invention in the aforementioned application includes a guide shoe and a presser shoe that are spring-loaded toward the sprocket and press against the tape in the area from where it leaves the sprocket until the point where it leads out through a guideway in the casing. Ordinarily, the shoes perform well in guiding the tape from the sprocket to the guideway, but there is a chance that the tape will not be properly guided if the belt transfer guide is stopped abruptly when it is being pushed by the drive device, i.e., when the tape is unwinding. In such an event, the spring force might be overcome, and the tape may buckle and loosen on the sprocket wheel. The holes in the tape, which have a variable pitch, might bind against the sprocket teeth, and this could cause the drive to stall.

SUMMARY OF THE INVENTION

The present invention overcomes the above-described possible problem with the guide arrangement of the prior invention. In particular, the present invention is characterized in that the drive device includes a rotatable sprocket wheel having a multiplicity of teeth extending radially outwardly with respect to the axis of rotation of the wheel and in that the drive element is a tape, one end of which is fastened to the belt transfer guide and the other end to the sprocket wheel. The tape has spaced-apart holes in at least the portion thereof adjacent the end that is fastened to the sprocket, the holes being adapted to receive the sprocket teeth such that the tape is able to be wound onto and unwound from the sprocket wheel to move the guide between the release and restraint locations. The sprocket wheel is received within a casing that has a guideway closely adjacent the sprocket wheel through which the tape passes and by which it is guided into and out of engagement with the sprocket wheel. To ensure that the wraps of the tape received on the sprocket wheel are kept tight at all times, especially during the time that the drive device is operating to push the belt transfer guide, there is a movable guide mechanism for guiding the part of the tape between the sprocket wheel and the guideway, the mechanism including a guide member engaging said part of the tape and movable generally radially of the sprocket wheel and a guide control member that is engageable with the guide member and is adapted to establish selected positions of the guide member in relation to the number of wraps of the tape on the sprocket wheel.

In one embodiment of the invention, the control member is rotatable with the sprocket wheel and includes a spiral groove that engages the guide member by means of a lug received in the spiral groove. The guide member is thus driven toward and away from the axis of the sprocket wheel at a rate that is a function of the number of wraps of the tape on the sprocket wheel. The guide control member may be a disc that is affixed to the shaft of the sprocket wheel in spaced-apart relation to the sprocket wheel, or the guide control member may be a portion of the sprocket wheel itself. Preferably the pitch of the spiral groove in the guide control member, according to this embodiment, is substantially equal to the thickness of the tape.

In another embodiment of the invention, the guide control member engages the guide member by means of ratchet teeth that are arranged to prevent the guide member from moving away from the sprocket wheel when they are engaged. A spring urges the guide member toward the sprocket wheel axis, and a clutch is interposed between the guide control member and the sprocket wheel and urges the ratchet teeth into engagement when the sprocket wheel rotates in the tape-unwinding direction and disengages the ratchet teeth when the sprocket wheel rotates in the tape-winding direction. There may be two or more guide control members, the ratchet teeth of each being staggered relative to the ratchet teeth of the other. In this way, the number of selected positions for the guide member is increased while still enabling comparatively large ratchet teeth to be used.

For a better understanding of the present invention, reference may be made to the following description of exemplary embodiments, taken in conjunction with the figures of the accompanying drawings.

DESCRIPTION OF EXEMPLARY EMBODIMENTS

Figure 1:
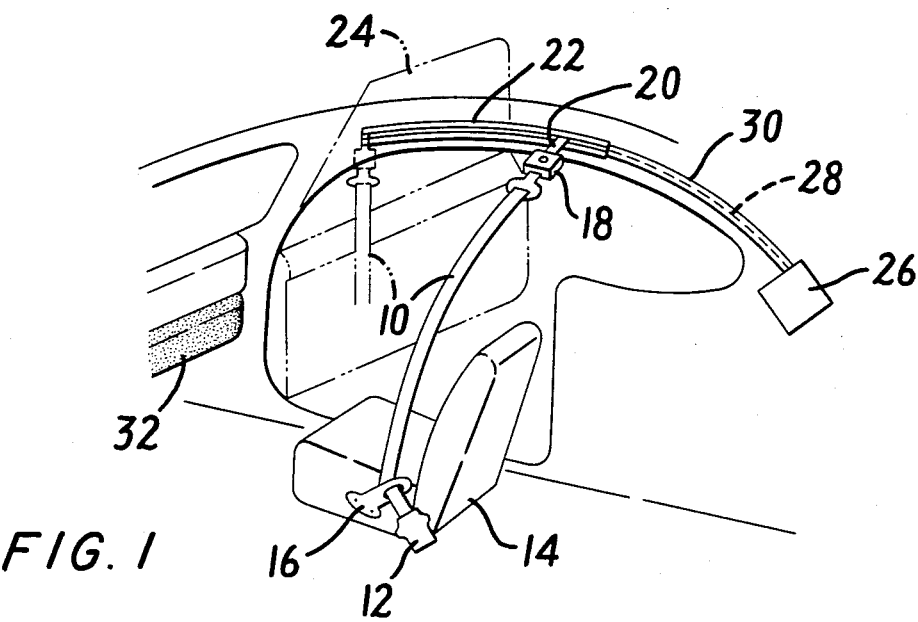
FIG. 1 is a pictorial view in generally schematic form of an exemplary passive belt system with which the present invention may be used.

In the passive belt system shown in FIG. 1, a shoulder belt 10 leads from an emergency locking retractor 12 affixed to the vehicle floor inboard of the seat 14 outwardly through a belt guide 16 to an emergency release buckle 18 on a movable anchor 20. The anchor 20 slides along a guide rail 22 on the vehicle roof above the door 24 and is driven between a forward release position and a rearward restraint position by a drive device that comprises a gear-reduced reversible electric motor unit 26 that drives a drive tape 28. The tape is constrained to move along a predetermined path of fixed length by a sheath 30. The output sprocket of the drive unit 26 drives the tape 28 in opposite directions in response to energization of the motor by a circuit that includes a door switch (not shown) for detecting opening and closing of the door 24. In this example of a passive belt system, the belt 10 is a shoulder belt which restrains the upper part of the vehicle occupant's body. The lower portion of the occupant's body is protected in the event of a collision or abrupt stop by an energy-absorbing knee bolster 32. The restraint system shown in FIG. 1 is merely exemplary of a variety of two point and three point passive systems with which the invention can be used.

Figure 2:
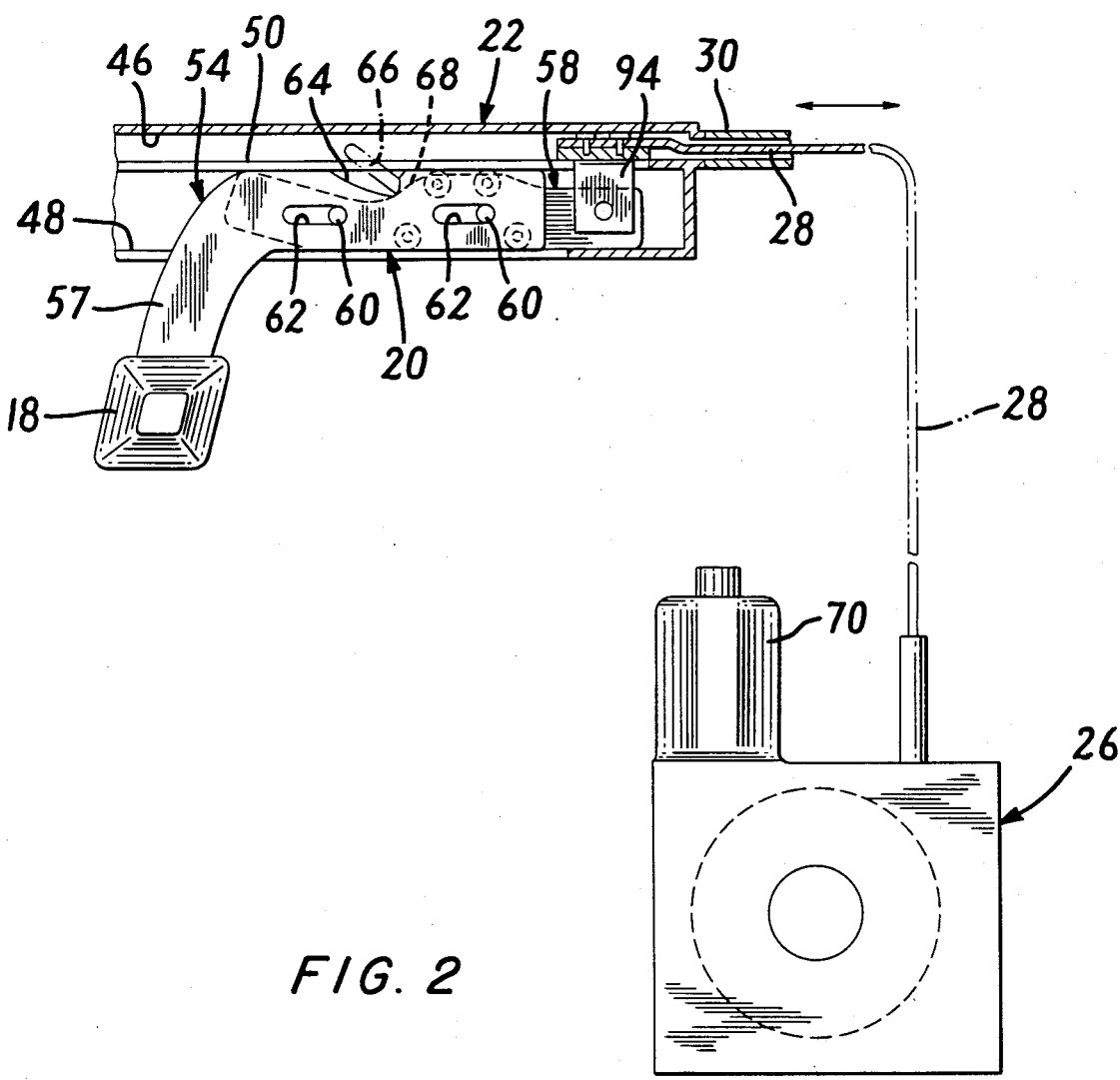
FIG. 2 is a side cross-sectional view of an exemplary belt transfer guide of the moving anchor type and also shows the drive unit and the drive tape.

As shown in FIG. 2, a guide rail 22 in the form of a channel is divided into a comparatively small compartment or guide passage 46 and a somewhat larger compartment or passage 48 by a dividing wall 50. The larger compartment 48 serves as a track for the belt transfer guide, which in this example is a movable anchor assembly 20 that includes an anchor member 54 carrying the emergency release buckle 18 on an arm portion 57 that extends out of the compartment 48 through a slot running along the bottom of the guide rail. The movable anchor further includes an actuating member 58 that is connected to the anchor member 54 by pins 60 that are received in elongated slots 62 in the anchor member, thereby coupling the actuating member 58 to the anchor member 54 for relative lengthwise motion for a distance equal to the lengths of the slots 62. A locking notch 64 in the upper edge of the locking member receives a locking pawl 66 mounted in triangular slots in the rail for movement between latching and unlatching positions. In the latching position shown in FIG. 2, the pawl engages a locking shoulder on the locking notch 64 and prevents the anchor member 54 from moving from right to left. Meanwhile, the actuating member 58 has been pulled from left to right by the drive unit 26 to locate a camming notch 68 in register with the locking notch 64 of the anchor member 54, thereby allowing the pawl 66 to fall by gravity or be pushed by a spring into the latched position.

When the actuating member 58 is pushed by the drive assembly (as described below) from right to left, the lost motion afforded by the pins 60 and slots 62 enables the actuating member 58 to move to the left, relative to the anchor member 54, and the camming notch 68 on the actuating member 58 lifts the pawl 66 up out of the locking notch 64 of the anchor member. When the pins 60 move to the full extent leftward in the slots 62, the pawl 66 is fully unseated from the locking notch 64, and the actuating member 58 commences pushing the anchor member 54 to the left toward the release position (not shown). The movable anchor assembly shown in FIG. 2 is merely exemplary of a variety of moving belt transfer guide members and assemblies for passive belt systems with which the present invention may be employed. For example, the invention can be used to move movable belt guide rings and movable anchors carried by guide rails affixed in various locations in the vehicle, such as on the door panel, on a console between the vehicle seats or on the inboard side of the vehicle seat. It can also be used to pivot belt transfer arms and levers.

The drive unit 26 (see FIGS. 3 to 5) comprises a reversible electric motor 70 that is energized, usually through a double-pole, double-throw door switch, to operate in one direction when the vehicle door is opened and in the reverse direction when the door is closed. The motor 70 drives a speed reduction gear train (details not shown) carried within a housing 72 and having an output shaft 74 that is supported within a bushing in a wall 78 that is common to the housing 72 for the gear train and a housing 80 for a sprocket wheel 82. The sprocket wheel 82 is connected to the shaft 74 by a coupling tube 84. Flats on the shaft connect the coupling tube to the shaft for rotation, and tabs 84a on the coupling tube extend into slots 82a (FIG. 7) on the sprocket wheel.

Figure 5:
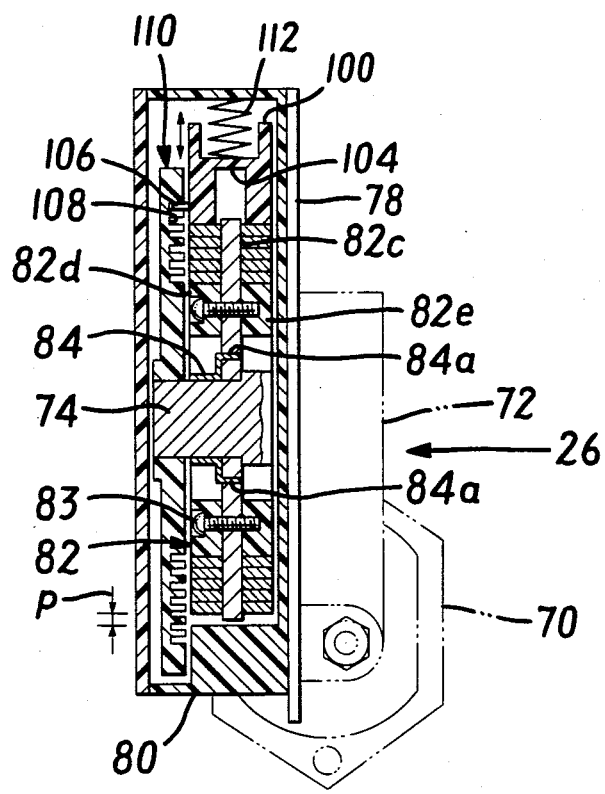
FIG. 5 is an end cross-sectional view of the embodiment shown in FIGS. 3 and 4.
Figure 7:
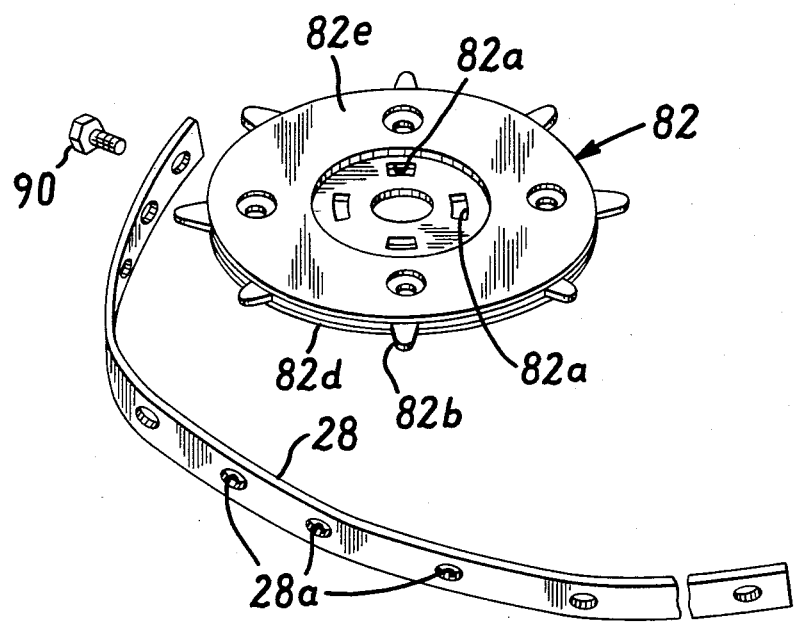
FIG. 7 is an exploded pictorial view of the sprocket wheel and drive tape.

As best shown in FIGS. 5 and 7 the sprocket wheel 82 has a multiplicity of sprocket teeth 82b on a metal body 82c and carries plastic discs 82d and 82e that are joined as a sandwich by screws 83. The drive tape 28 is fastened, such as by a screw 90, to the perimeter of the sprocket wheel 82 and has a multiplicity of longitudinally spaced-apart holes 28a that receive the teeth on the sprocket wheel. The distance between adjacent holes 28a in the tape corresponds to the circumferential distance between the sprocket teeth. As is apparent from FIG. 3 of the accompanying drawings, when a number of turns of the drive tape are wound on the sprocket wheel, the circumferential distance measured along the tape between the sprocket teeth increases. Accordingly, it is preferable that the distance between the holes 28a vary in accordance with the number of turns of the tape wrapped on the wheel underneath each pair of adjacent holes.

The drive tape 28 is guided out of the casing 80 through a guideway 90 and runs through the sheath 30, which extends the entire distance between the drive unit 26 and the guide rail 22 so that it maintains a constant length of tape between the drive unit and the belt transfer guide. The free end of the tape is fastened to a coupling element 94 that, in turn, is connected to the actuating member 58 of the movable anchor assembly (see FIG. 2).

When the motor 70 is energized in a direction such that the sprocket wheel 82 is rotated counterclockwise (with reference to FIG. 4), thereby to unwind the drive tape 28 from the sprocket wheel, the movable anchor assembly is unlatched from the restraint position shown in FIG. 2 and moved to the left (with reference to FIG. 2) to the release position at the front end of the guide rail. The motor 70 is stopped at the release position in a suitable known manner, such as by limit switches associated with the drive unit, the drive tape or the guide. When the door is reclosed, the motor 70 is energized in the opposite direction, thereby rotating the sprocket wheel 82 clockwise (with reference to FIG. 3), winding the drive tape 28 back onto the sprocket wheel and in the process pulling the movable anchor assembly back to the restraint position in which the anchor member 54 is securely held in locked condition by the pawl 66. The motor is stopped by a limit switch.

The tape itself can be reasonably characterized as essentially flexible in nature, a property it must possess in order that it can be wound easily onto the sprocket wheel. On the other hand, it has, of course, sufficient stiffness to enable it to push the transfer guide when it is driven by the sprocket wheel in the unwinding direction. To this end, the sheath 30 and the compartment 46 of the guide rail constrain the tape to move along a predetermined path and prevent it from buckling so it can push the movable anchor from the restraint to the release position.

Figures 10A, 10B:
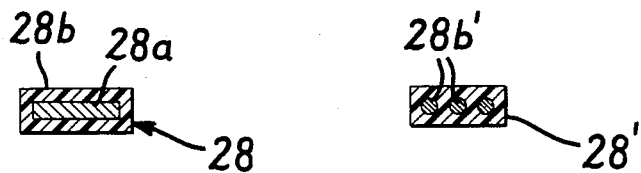
FIGS. 10A and 10B are end cross-sectional views of suitable drive tapes for use in the present invention.

The desired characteristics for the tape are preferably obtained from a composite construction. As shown in FIG. 10A, the tape comprises a thin metal band 28b encased within a casing 28c of polymeric material, such as nylon or polyurethane. The covering 28c of polymeric material keeps friction low, provides wear resistance, and reduces noise. Alternatively, a tape 28' of polymeric material strengthened and dimensionally stabilized by wire or synthetic fiber reinforcing strands 28b' (see FIG. 10B) may be used. The cross-sectional shape of the tape can be rectangular (as shown), trapezoidal, or oval.

Figure 3:
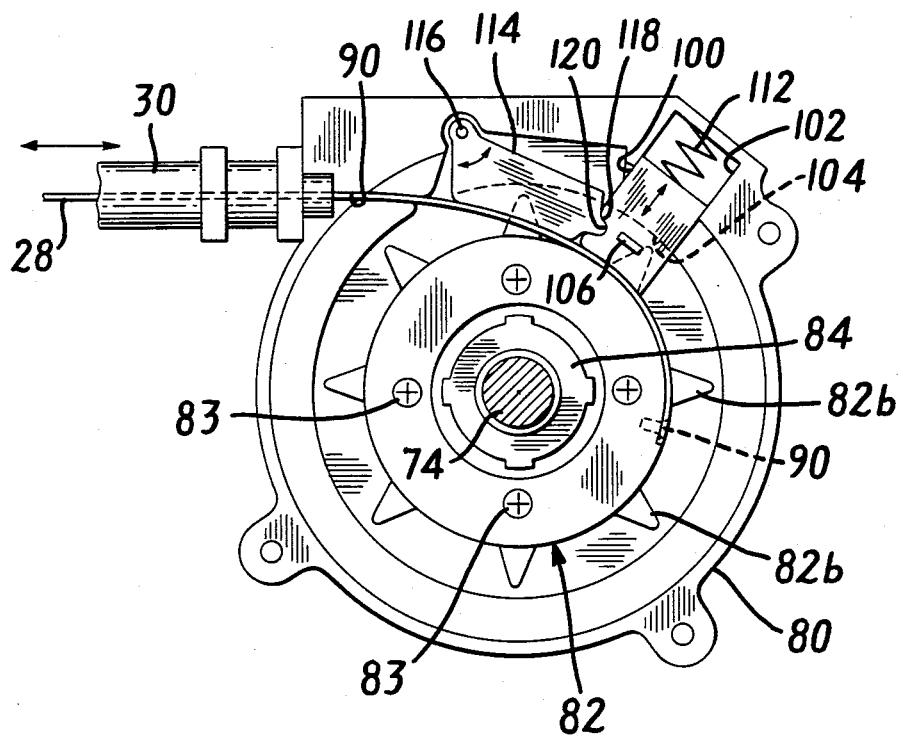
FIG. 3 is a side cross-sectional view of the drive unit taken just inside a control disc and shows the drive tape fully unwound from the sprocket wheel.
Figure 6:
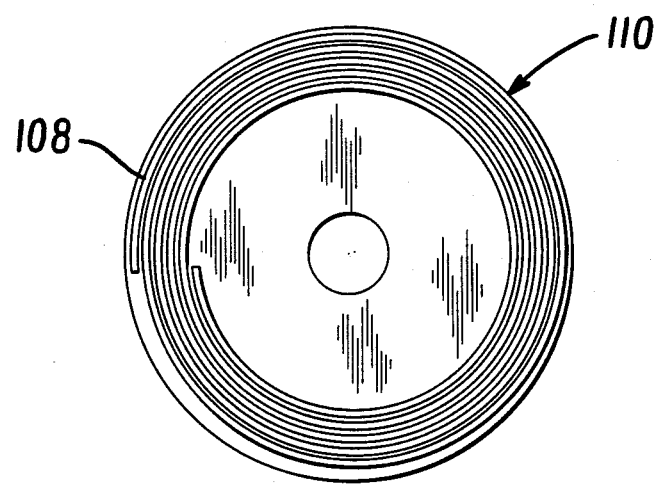
FIG. 6 is a side elevational view of the guide control member of the embodiment shown in FIGS. 3 to 5.

When the tape 28 is being wound onto the sprocket wheel the forces resisting movement of the belt transfer guide from the release location to the restraint location ensure that the tape 28 will wind reasonably tightly onto the sprocket wheel. On the other hand, when the belt transfer guide is being moved from the restraint location to the release location, the tape 28 must push the transfer guide against the forces resisting movement. It would, therefore, be possible for the tape to loosen on the sprocket wheel and be forced outwardly against the wall of the casing, were not some provision made to keep the tape tight on the sprocket wheel when the tape is being unwound. The present invention provides such an arrangement, namely, a movable guide mechanism for guiding the part of the tape between the sprocket wheel and the guideway. The guide mechanism in the embodiment of FIGS. 3–5 includes a first guide member 100 received in a guide recess 102 in the casing 80 for movement generally radially with respect to the output shaft 74 of the drive device. The guide member 100 has a slot 104 in the portion facing toward the sprocket wheel 82, in order that the teeth 82b of the sprocket wheel can freely rotate past the guide member. The slot separates the inwardly facing part of the guide member into a pair of feet that press against the tape 28. A small lug 106 extends out from a side face of the guide member 100 and is received in a spiral groove 108 in a guide control member 110. In the embodiment of FIGS. 5 to 7, the guide control member is a disc that is fastened to the output shaft 74 of the drive device and hence rotates with the sprocket wheel. The pitch of the spiral groove in the control disc 100, which is represented by the dimension lines P in FIG. 5, is uniform and is substantially equal to the thickness of the tape 28. Accordingly, the spiral groove, as it rotates relative to the guide member 100, establishes an infinite number of selected positions of the guide member in direct relation to the number of wraps of the tape on the sprocket wheel. When the tape 28 is almost completely unwound from the sprocket wheel, as shown in FIG. 3, the lug 106 on the guide member 100 resides in the radially innermost portion of the spiral groove in the control disc. As the sprocket wheel rotates counterclockwise and, hence, winds the tape onto the sprocket wheel, rotation of the control disc moves the spiral groove relative to the lug 106 and progressively moves the guide member 100 outwardly at a rate corresponding to the progressive winding of the tape onto the sprocket wheel. Ordinarily, the winding of tape onto the sprocket wheel during clockwise rotation inherently provides for maintaining the tape reasonably tight on the reel, so the control member is essentially passive in the tape winding mode of operation. When the tape is unwound from the sprocket wheel upon clockwise rotation, i.e., starting from the configuration shown in FIG. 4, for example, the rotation of the spiral groove of the control disc relative to the lug 106 on the guide member 100 pulls the guide member 100 radially inwardly toward the tape in direct relation to the number of wraps of the tape on the sprocket wheel. Any tendency for the tape 28 to loosen on the sprocket wheel as it is unwinding and pushing against the force resisting movement of the transfer member is prevented by the controlled movement of the guide member 100, which can only move out to the extent controlled by the spiral groove in the control disc.

A spring 112 is installed between the casing 80 and the control member 100 to assist in preventing the tape from loosening on the sprocket wheel. The spring 112 tends to make the operation of the device smoother by reducing the forces due to friction acting between the lug 106 and the spiral groove. The spring 112, however, is not required.

Figure 4:
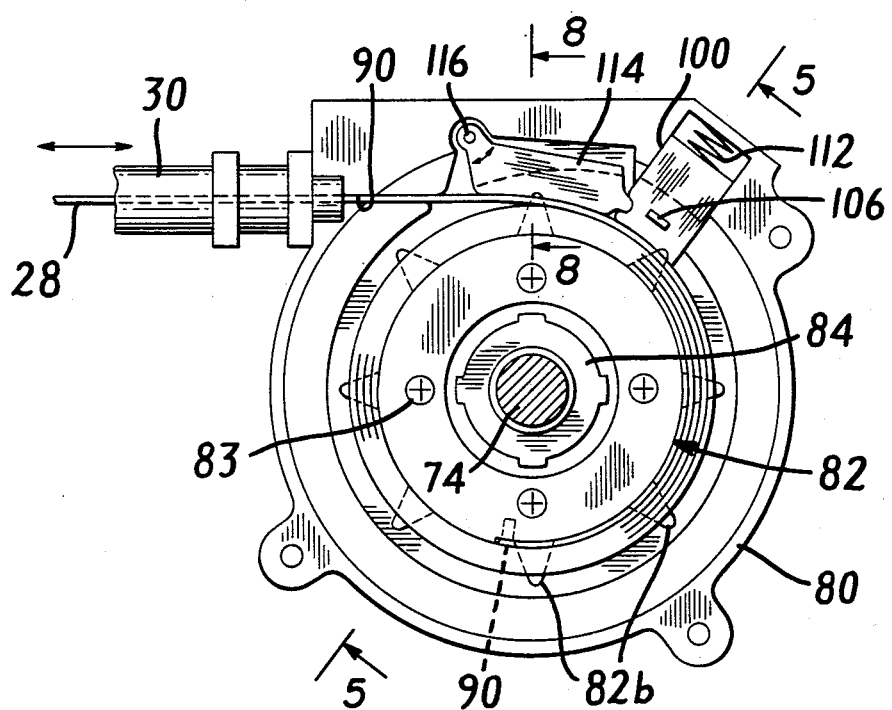
FIG. 4 is a view similar to FIG. 3, except that there are several wraps of the drive tape wound onto the sprocket wheel.
Figure 8:
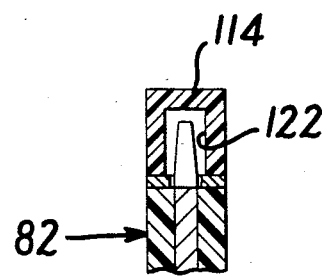
FIG. 8 is a fragmentary cross-sectional view taken along the lines 8—8 in FIG. 4 and in the direction of the arrows.

In addition to the guide member 100, the embodiment shown in FIGS. 3 to 5 includes a second guide member 114 that is mounted to pivot about a pivot pin 116 and pivots in correspondence with the inward or outward movement of the control member 100 by means of the engagement of a lug 118 on the guide member 114 in a notch 120 in the guide member 100. The guide member 114 assists the guide member 100 in controlling the path of the tape in the general area where the tape leaves the sprocket wheel and passes into the guideway 90. As may be observed in FIG. 8, the guide member 114 has a slot 122 that opens toward the sprocket wheel 82 and allows the sprocket teeth to pass freely while enabling the two legs on either side of the slot to press against the tape and control the path taken by the tape.

Figure 9:
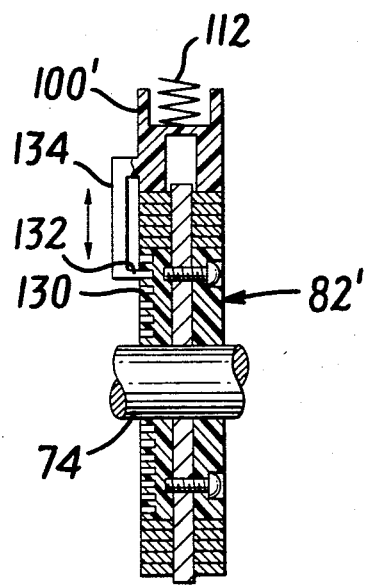
FIG. 9 shows a modification of the embodiment shown in FIGS. 3 to 8.

FIG. 9 of the drawings illustrates a modification of the embodiment of FIGS. 3 to 5. In particular, instead of having a separate control disc, the spiral groove 130 is formed in the sprocket wheel 82' itself. Engagement between the spiral groove and the control member 100' is afforded by a lug 132 that extends into the spiral groove 130 from a support arm portion 134 of the control member 100'. The operation of the embodiment of FIG. 9 is the same as that of the embodiment of FIGS. 3 to 5.

Figure 11:
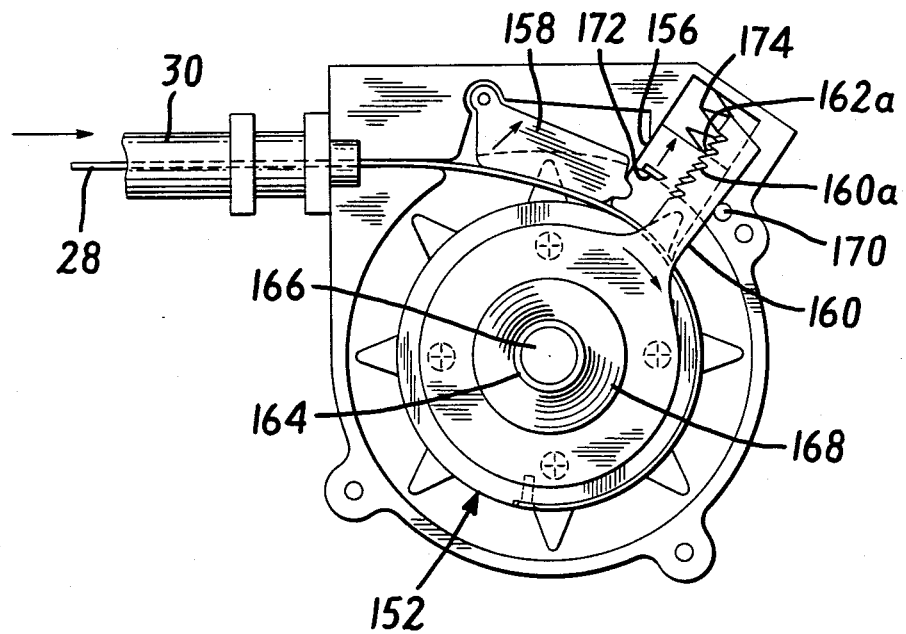
FIG. 11 is a side elevational view of another embodiment of the invention with the cover removed.
Figure 12:
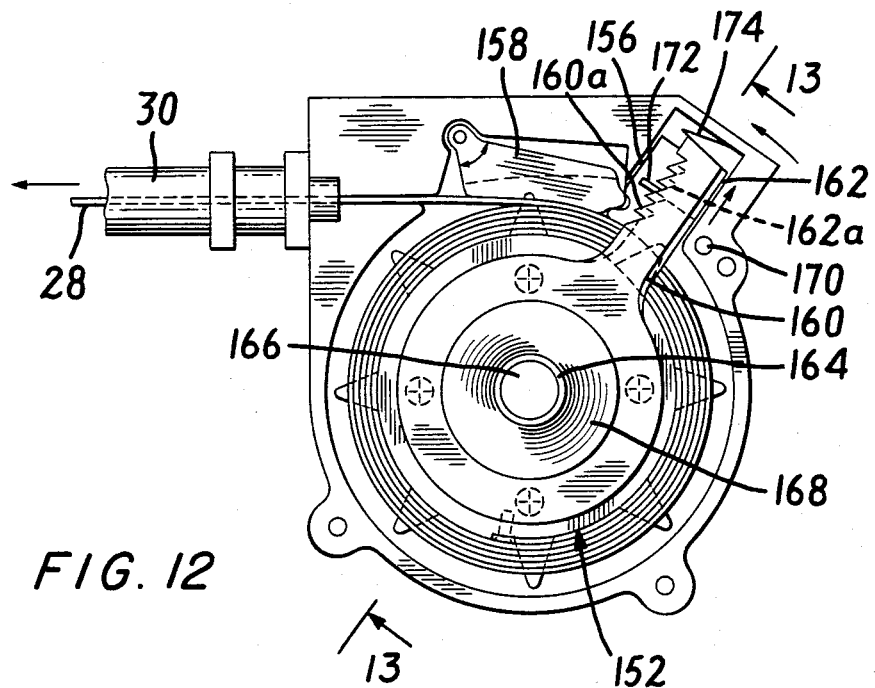
FIG. 12 is a view similar to that of FIG. 11 except that several wraps of tape are wound onto the sprocket wheel.
Figure 13:
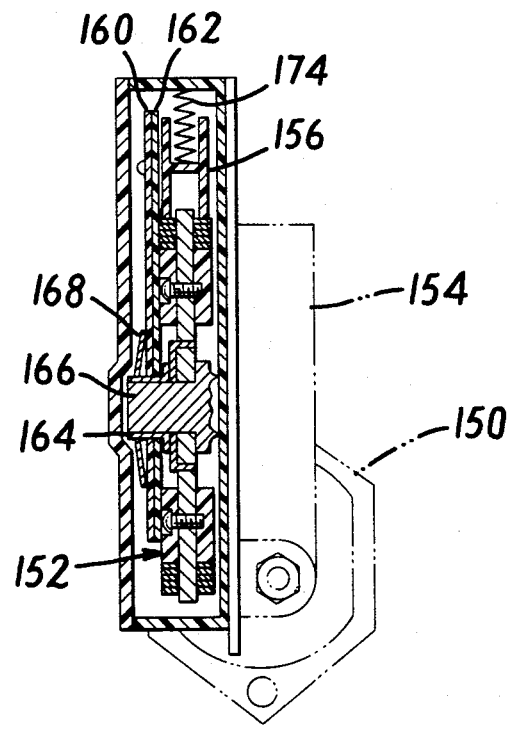
FIG. 13 is an end cross-sectional view of the embodiment shown in FIG. 12 taken generally along the lines 13—13 of FIG. 12.

In another embodiment of the invention, which is shown in FIGS. 11 to 13, a drive motor 150 drives a sprocket wheel 152 through a speed reducer gear train 154. A first control member 156 and a second control member 158 that are, in most respects, the same as those of the embodiment of FIGS. 3 to 5, are maintained in selected positions in relation to the number of wraps of the tape on the sprocket wheel by at least one control member that engages the guide member by means of ratchet teeth that are arranged to prevent the guide member from moving away from the sprocket wheel when they are engaged. In the embodiment shown in the drawings, there are two such control members, 160 and 162. Each control member is a flat plate having a circular body that has a hole and that fits onto a collar 164 on the output shaft 166 and is held in place by a disc spring clutch 168. Each control member 160 and 162 has an arm that extends outwardly and overlies a portion of the guide member 156. Each arm portion has a series of ratchet teeth, 160a and 162a, respectively, the teeth of one of the control members being staggered with respect to the teeth of the other control member. When the tape is being wound onto the sprocket wheel (FIG. 11), the clutch spring 168 urges the control members in the clockwise direction against a stop pin 170. The clutch spring 168 allows the sprocket wheel and the sprocket wheel shaft to rotate in the clockwise direction and relative to the then stationery control members. In the winding mode, the ratchet teeth 160a and 162a of the control members are held out of engagement away from a lug 172. Accordingly, the control member 156 is free to move radially outward as the tape winds onto the sprocket wheel.

As shown in FIG. 12, when the tape is being unwound upon counterclockwise rotation of the sprocket wheel, the clutch disc 168 frictionally urges the two control members to rotate in the counterclockwise direction, thereby engaging the ratchet teeth on both of the control members with the control lug 172. A spring 174 pushes the control members 156 and 158 inwardly against the tape as the tape progressively unwinds from the sprocket wheel. The force of the spring urging the guide members inwardly is adequate to keep the tape tightly wound on the sprocket wheel as long as the forces resisting movement of the belt transfer member are those that are normally encountered. If, for any reason, the belt transfer members should be stopped abruptly while being moved from the restraint position to the release position, any tendency for the tape to loosen on the sprocket wheel will be prevented by engagement between the ratchet teeth on the control members and the lug. When movement of the belt transfer member resumes, the spring 174 then pushes inwardly so that the control members 156 and 158 continue to move in as the tape unwinds from the sprocket wheel. The force of the spring is also sufficient to cause each control member to counter-rotate, relative to the clockwise rotation of the sprocket wheel and against the urging of the clutch disc 168 to allow the lug to move from tooth to tooth along the respective control members. It is not essential to have two control members, but it is advantageous to have two or more in order to increase the number of stop positions for the control member. Moreover, when one of the teeth on one of the control members has been nearly disengaged by counter-rotation, a tooth of the other control member is in position to be engaged immediately by the lug; hence, two control members provide greater control by ensuring that there is always a tooth in position to be engaged with the lug, rather than having momentary complete release of the lug as it passes over the tip of each tooth in the case of a single control member.

Thus, there is provided, in accordance with the present invention, a compact and highly effective drive device for use in passive vehicle occupant seat belt systems. The invention ensures that the tape will always remain tightly wound on the reel and is not permitted to loosen in the event that the belt transfer member is abruptly stopped while moving under the operation of the drive device in the pushing mode.

The above-described embodiments of the invention are merely exemplary, and numerous variations and modifications will be readily apparent to those skilled in the art without departing from the spirit and scope of the invention.

I claim:

1. A passive vehicle occupant restraint belt system having a belt, a belt transfer guide that is movable between restraint and release locations in the vehicle in which it holds the belt in occupant-restraining and occupant-releasing positions, respectively, and a reversible drive device that is coupled by a flexible drive element to the belt transfer guide and is operable in response to opening and closing of the vehicle door to move the guide between the release and restraint locations characterized in that the drive device includes a rotatable sprocket wheel having a multiplicity of teeth extending radially outwardly with respect to the axis of rotation of the wheel, in that the drive element is a tape, one end of which is fastened to the belt transfer guide and the other end to the sprocket wheel, the tap having spaced-apart holes in at least the portion thereof adjacent said other end that are adapted to receive the sprocket teeth such that the tape is wound onto and unwound from the sprocket wheel to move the guide between said locations, in that there is a guideway closely adjacent the sprocket wheel through which the tape passes and by which it is guided into and out of engagement with the sprocket wheel and in that there is a movable guide mechanism for guiding the part of the tape between the sprocket wheel and the guideway, the guide mechanism including a guide member engaging said part of the tape and movable generally radially of the sprocket wheel and a guide control member that is engageable with the guide member and is adapted to establish selected positions of the guide member in relation to the number of wraps of the tape on the sprocket wheel, whereby the wraps of the tape wound on the sprocket wheel are prevented from loosening in the event that the belt transfer guide should stop abruptly while the tape is pushing it and is unwinding from the reel.

2. A restraint belt system according to claim 1 and further characterized in that the guide control member is rotatable with the sprocket wheel and includes a spiral groove that engages the guide member by means of a lug, the guide member thus being driven toward and away from the axis of the sprocket wheel by the guide control member at a rate that is a function of the number of wraps of the tape on the sprocket wheel.

3. A restraint belt system according to claim 2 and further characterized in that the guide control member is a disc that is affixed to the shaft of the sprocket wheel in spaced-apart relation to the sprocket wheel.

4. A restraint belt system according to claim 2 and further characterized in that the guide control member is a portion of the sprocket wheel.

5. A restraint belt system according to claims 2, 3 and 4 and further characterized in that the pitch of the spiral groove is uniform and is substantially equal to the thickness of the tape.

6. A restraint belt system according to claim 2 and further characterized in that the guide control member engages the guide member by means of ratchet teeth that are arranged to prevent the guide member from moving away from the sprocket wheel when they are engaged, in that a spring urges the guide member toward the sprocket wheel axis, and in that a clutch is interposed between the guide control member and the sprocket wheel and urges the ratchet teeth into engagement when the sprocket wheel rotates in the tape-unwinding direction and disengages the ratchet teeth when the sprocket wheel rotates in the tape-winding direction.

7. A restraint belt system according to claim 6 and further characterized in that there are at least two guide control members, the ratchet teeth on one being staggered relative to the ratchet teeth on the other.

* * * * *